United States Patent
Shyu et al.

(10) Patent No.: US 7,606,891 B1
(45) Date of Patent: Oct. 20, 2009

(54) APPROACH FOR DETERMINING COMPRESSION INTERVALS AND PERFORMING EVENT COMPRESSION

(75) Inventors: Jackson Shyu, Fremont, CA (US); Petre Dini, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

(21) Appl. No.: 10/179,542

(22) Filed: Jun. 24, 2002

(51) Int. Cl.
*G06F 15/173* (2006.01)
*G06F 11/00* (2006.01)

(52) U.S. Cl. .................... 709/224; 709/223; 714/39; 714/47

(58) Field of Classification Search ............... 709/223, 709/224; 714/39, 47
See application file for complete search history.

(56) References Cited

U.S. PATENT DOCUMENTS

| | | | |
|---|---|---|---|
| 6,125,392 A | 9/2000 | Labatte et al. | |
| 6,792,456 B1 * | 9/2004 | Hellerstein et al. | 709/224 |
| 6,801,940 B1 * | 10/2004 | Moran et al. | 709/224 |
| 2003/0149761 A1 * | 8/2003 | Baldwin et al. | 709/224 |

* cited by examiner

*Primary Examiner*—Peling A Shaw
(74) *Attorney, Agent, or Firm*—Hickman Palermo Truong & Becker LLP

(57) ABSTRACT

An approach for determining compression intervals generally involves determining a compression interval based upon frequencies of event instances. According to the approach, event data is received that specifies instances of an event. The event data is analyzed and a compression interval is determined based upon frequencies of the instances of the event. The compression interval is selected to provide a balance between insufficient compression (under compression) and poor performance associated with over compression. Event compression may then be performed using the compression interval and report data may be generated that specifies the occurrence of the event.

22 Claims, 5 Drawing Sheets

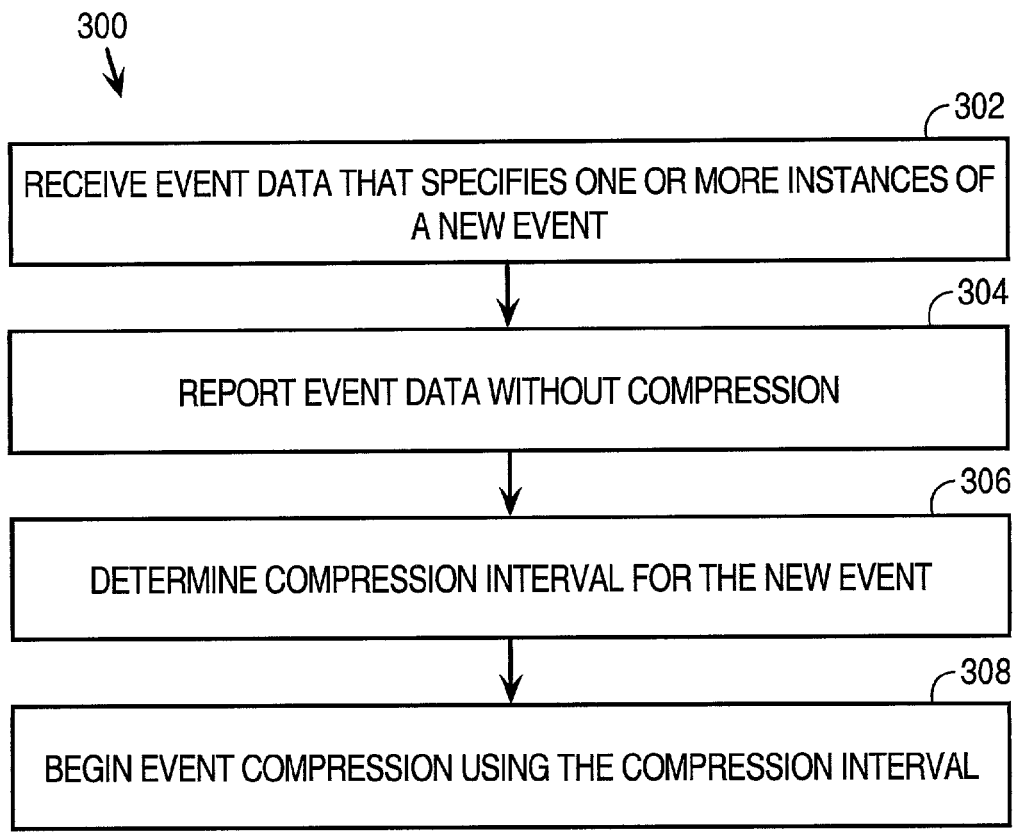

APPROACH FOR DETERMINING COMPRESSION INTERVALS AND PERFORMING EVENT COMPRESSION

FIELD OF THE INVENTION

This invention relates generally to event-based networking and computing systems, and more specifically, to an approach for determining compression intervals and performing event compression.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Most event-based or event-driven networking and computing systems include some type of event compression mechanism to reduce the number of instances of an event that are reported. As used herein, the term "event" refers to a condition or occurrence. In computing systems, events are typically represented by event data that defines attributes of the event. For example, in communications networks, network devices are typically configured to generate event data in response to detecting a particular condition or occurrence and provide the event data for processing to another entity, such as a software layer associated with the network device.

An event compression mechanism is conventionally configured to intercept all instances of a particular type of event over a specified period of time, referred to herein as the "compression interval," and report the occurrence of the event once, regardless of how many instances of the event occurred during the compression interval. For example, suppose that an event compressor is configured with a compression interval of sixty seconds. Suppose further that during the sixty second period, one hundred instances of the particular event occur.

The event compressor intercepts all one hundred instances of the particular event during the sixty second period and provides, e.g., to a software processing layer, a single report of the particular event. The one hundred instances of the event are typically "flushed" by the event compressor and not reported to the software processing layer. The event compressor may also be configured to report the number of instances of the particular event that are associated with the report. Thus, in the present example, the event compressor also specifies to the software processing layer that the particular event occurred one hundred times during the sixty second period of time, but without having to provide the event data for all one hundred instances. The actual time of each occurrence may also be provided with the reporting data, or discarded, depending upon the application.

The ratio of the number of instances of an event per report is referred to as the "compression ratio." Thus, in the present example, the compression ratio is one hundred-to-one, since the one hundred instances were compressed into a single report.

Event compressors provide some significant benefits. In particular, in situations where a persistent condition causes the generation of large numbers of instances of events, an event compressor can reduce the number of duplicate events that are reported to higher layers, thereby providing more efficient processing of events. For example, in the context of a communications network where a network device has failed for a prolonged period of time, an event compressor prevents large numbers of duplicate error events, typically in the form of error messages, from being generated periodically. In this situation, the duplicate error messages don't convey much additional useful information to administrative personnel, other than the fact that the condition that caused the error still exists. The event compressor can notify and give administrative personnel time to analyze and repair the problem, while avoiding the generation of large numbers of duplicate error messages that provide little added benefit.

Despite the advantages provided by event compressors, they are not without their drawbacks. In particular, compression intervals are typically implemented as static timers that are not easily changed. Moreover, selecting an optimal compression interval can be difficult. If the selected compression interval is too short (under compression), then there will be insufficient event compression, resulting in an excessive number of duplicate events being provided to higher layers. If the selected compression interval is too long (over compression), then the response time may be too slow, resulting in the error condition going undetected (and not addressed) for too long.

Many times a single compression interval is specified for all types of events, which further decreases the effectiveness of event compression, since different types of events may occur at different frequencies. Even if different compression intervals were used for different types of events, the frequency at which instances of any particular type of event may change over time, which reduces the effectiveness of event compression.

Based upon the foregoing, there is a need for an approach for determining compression intervals and performing event compression that does not suffer from the limitations in prior approaches. There is a particular need for an approach for performing event compression that is less likely to perform under compression or over compression of events.

SUMMARY OF THE INVENTION

The foregoing needs are addressed generally by determining compression intervals for event compression based upon frequencies at which event instances occur. According to one aspect of the invention, an approach is provided for processing event data. According to the approach, event data is received that specifies one or more instances of an event. One or more particular instances of the event are selected for processing from the one or more instances of the event based upon a specified time interval. The specified time interval is determined based upon frequencies of one or more prior instances of the event, i.e., frequencies at which the one or more prior instances of the event occurred. According to another aspect of the invention, the specified time interval is dynamically adjusted over time, e.g., "on the fly," based upon frequencies at which additional event instances occur.

According to another aspect of the invention, an approach is provided for determining a specified time interval to be used for event compression of an event. According to the approach, the specified time interval is determined based upon frequency data that specifies frequencies of one or more instances of the event, i.e., frequencies at which the one or more instances of the event occurred, also referred to herein as a frequency spectrum pattern.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram that depicts an approach for processing event data when a compression interval has not yet been determined.

FIG. 4 is a block diagram that depicts a compression interval table.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. DETERMINING COMPRESSION INTERVALS BASED UPON FREQUENCY PATTERNS OF EVENT INSTANCES
III. COMPRESSION INTERVAL TABLES
IV. ADAPTIVE COMPRESSION INTERVAL DETERMINATION
V. IMPLEMENTATION MECHANISMS

I. Overview

An approach for determining compression intervals generally involves determining a compression interval based upon frequencies, or a frequency pattern, of event instances. According to the approach, event data is received that specifies instances of an event. The event data is analyzed and a compression interval is determined based upon the frequencies, or the frequency pattern, of the instances of the event. Event compression is then performed using the compression interval and report data is generated that specifies the occurrence of the event. The report data may also specify an actual time of occurrence of each event instance, depending upon the requirements of a particular application. This approach reduces the likelihood that over compression or under compression will occur.

Figure 1:
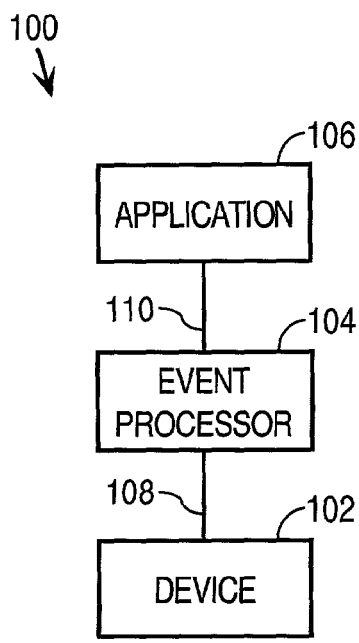
FIG. 1 is a block diagram that depicts an approach for determining compression intervals and performing event compression.

FIG. 1 is a block diagram of an arrangement 100 for determining compression intervals and performing event compression according to an embodiment. Arrangement 100 includes a device 102, an event processor 104 and an application 106. Device 102 and event processor 104 are communicatively coupled via a link 108. Event compressor 104 and application 106 are communicatively coupled via a link 110.

For purposes of explanation, links 108, 110 are depicted in FIG. 1 as direct connections. Links 108, 110, may however, be implemented by any medium or mechanism that provides for the exchange of data between device 102, event processor 104 and application 106. Examples of links 108, 110 include, without limitation, a network such as a Local Area Network (LAN), Wide Area Network (WAN), Ethernet or the Internet, or one or more terrestrial, satellite or wireless links. For purposes of brevity, links 108, 110 are depicted in FIG. 1 as direct connections between device 102 and event processor 104, and between event processor 104 and application 106, respectively. Links 108, 110 do not have to be physically direct links, however, and may involve connections through any number of network elements, for example network switches, hubs and routers that are not depicted in FIG. 1. Furthermore, links 108, 110 may be software links, e.g., routine calls, rather than physical connections.

Device 102 is configured to generate, in response to a condition or occurrence, event data that defines one or more attributes of the condition or occurrence. The event data may be in any format, depending upon the requirements of a particular implementation. For example, device 102 may generate event data that conforms to a particular message format or communications protocol required by event processor 104 and/or application 106. Device 102 is further configured to provide event data to event processor 104 over link 108. Device 102 may be any type of device and the invention is not limited to any particular type of device. For example, device 102 may be an element in a communications network, such as a switch, hub, router, computer system or module in a computer system.

Event processor 104 is configured to process event data received from device 102 and to generate and provide report data to application 106. The report data may include part or all of the event data received from device 102 and may include additional data. For example, event processor 104 may be configured to include, in report data, a time stamp, or list of time stamps, that indicates when event data was received by event processor 104 from device 102. Event processor 104 may be implemented as one or more hardware elements, computer software, or a combination of hardware elements and computer software, depending upon the requirements of a particular application, and the invention is not limited to any particular implementation.

According to one embodiment, event processor 104 is configured to determine a compression interval for an event based upon frequencies of instances of the event. For example, suppose that event processor 104 receives event data from device 102 for one hundred instances of a particular event. The event data may include a separate event data item for each event instance, a separate event data item for groups of event instances, or a single event data item for all one hundred event instances, and the invention is not limited to any particular type or format of event data.

Event processor 104 analyzes the event data and determines a compression interval to be used for performing event compression for the event. The compression interval is used to process the instances of the event used to determine the compression interval and/or other instances of the event. In general, a relatively short compression interval is use when the frequency of the instances of the event is high, while a relatively longer compression interval is selected when the frequency of the instances of the event is low. The shorter the compression interval, the more frequently the occurrence of an event will be reported, assuming that at least one instance of an event occurs within the compression interval. According to one embodiment, if no event instances occur within a compression interval, then no report is generated. It is generally desirable to select a compression interval that is sufficiently long to provide meaningful compression, without being too long to cause poor response time. Specific examples for selecting the compression interval based upon frequency of prior instances of events are described in more detail hereinafter.

Thus, event processor 104 serves as an intermediary between device 102 and application 106 and manages the reporting of events to application 106 using event compression with an interval timer determined in accordance with embodiments described herein.

Figure 2:
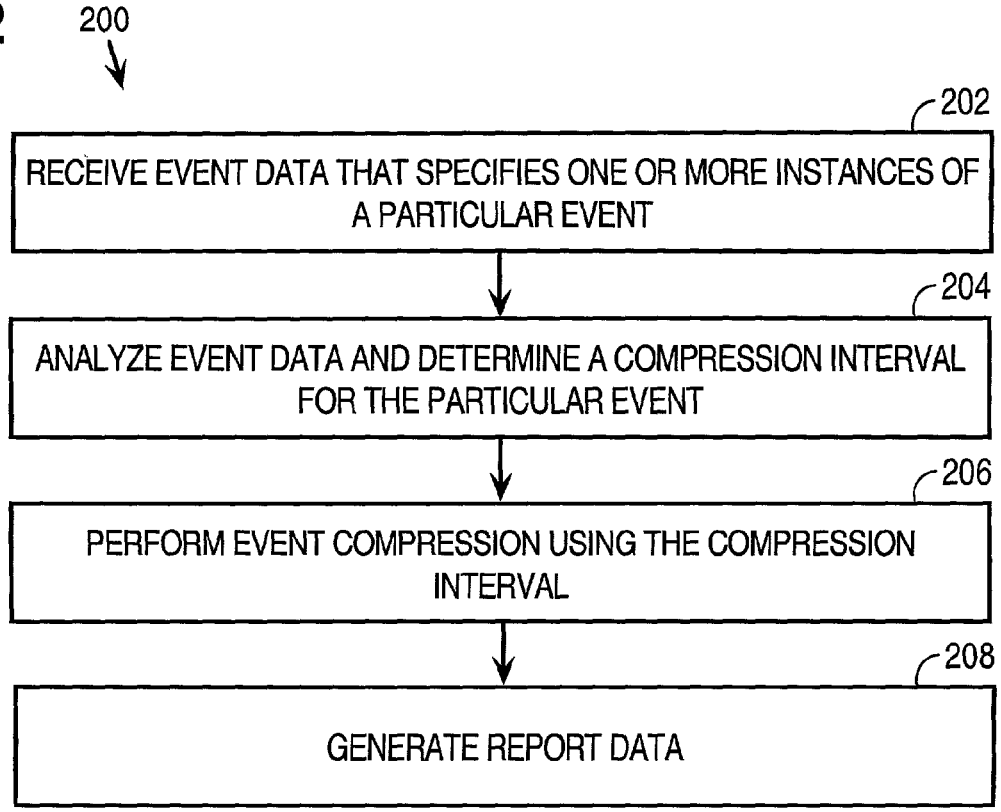
FIG. 2 is a flow diagram that depicts an approach for determining compression intervals and performing event compression.

FIG. 2 is a flow diagram 200 that depicts an approach for determining compression intervals and performing event compression according to an embodiment. In step 202, event data is received that specifies one or more instances of an event. As an example, it is assumed that event processor 104 receives event data from device 102 that defines one hundred instances of a particular event.

In step 204, the event data is analyzed and a compression interval is determined for the particular event based upon frequencies, or frequency pattern, of instances of the event, e.g., 10 instances per second or one event every 60 seconds. In the present example, event processor 104 analyzes the event data received from device 102 and determines a compression interval for the particular event based upon frequencies, or frequency pattern, of the one hundred instances of the particular event. Initially, the event data may or may not contain sufficient information, or may not be consistence enough, to determine a compression interval. For example, a particular event may occur only once and never again so that a frequency pattern cannot be established. In this situation, processing may skip to step 208 below and then return to step 202. For purposes of explanation, it is assumed that the event data contains sufficient information from which a compression interval can be determined.

In step 206, event compression is performed using the determined compression interval. Event compression may be performed on the instances of the particular event that were used to determine the compression interval. For example, if event processor 104 stored the event data for the one hundred instances of the particular event, then event processor 104, may perform event compression on the one hundred instances of the particular event using the determined compression interval. Thus, if the compression interval for the particular event were determined to be one second, then event processor 104 would compress all of the instances of the particular event that occurred during the one second interval and make a single report to application 106 for those instances of the particular event. Alternatively, event compression may be performed on additional instances of the particular event. In this situation, all instances of the particular event occurring during each one-second interval would be compressed and reported once to application 106.

In step 208, report data is generated for the particular event. In the present example, for each compression interval, if at least one instance of the particular event occurred, event processor 104 generates report data that specifies that the particular event occurred. Event processor 104 provides the report data to application 106 for processing. The report data may also specify the number of instances of the particular event that occurred during the compression interval. The report data may also specify times at which the instances of the particular event occurred.

II. Determining Compression Intervals Based Upon Frequency Patterns of Event Instances As described herein, compression intervals are determined based upon the frequencies, or frequency pattern, of instances of events. A variety of approaches are available for determining the frequencies of instances of an event, depending upon the details of a particular implementation, and the invention is not limited to any particular mechanism for determining the frequencies of instances of events. For example, event data may include data, such as a time stamp, that indicates when each instance of an event has occurred. In distributed computing applications, a centralized or common clock or timing mechanism may be used to determine the timing of event instances. Frequencies of instances of events may then be determined based upon times at which the instances of events occurred. Event processor 104 may determine the frequencies of events based upon timing data. Alternatively, another entity, such as a stand-alone mechanism, or device 102, may determine the frequency of instances of an event and provide frequency data to event processor 104 that indicates the frequency at which instances of events occurred, e.g., the number of times that instances of an event occurred during a specified period of time.

Once the frequencies pattern of a set of instances of an event is known, a heuristic may be used to determine an appropriate compression interval. For example, for a particular event having N number of instances that occur at a frequency of sixty per minute, a suitable compression interval may be one minute, providing a compression ratio of sixty-to-one with a response time of one minute. Longer compression intervals may be determined for events with instances that occur that a lower frequency. For example, for another event having N number of instances that occur at a frequency of one instance per hour, a suitable compression interval might be three hours. This would provide a compression ratio of three-to-one and a response time of three hours.

In situations where the frequencies at which instances of an event occur are sufficiently low, it may be necessary to use a compression interval that provides a lower compression ratio, e.g., two-to-one or one-to-one, in order to provide adequate response time. For example, suppose that instances of a particular event occur once every ten hours. In this situation, it may be appropriate to use a compression interval of five hours. Even though this will result in a compression ratio of only one-to-one, assuming the current instance frequency of once per ten hours continues, it may be necessary to provide a report to administrative personnel every five hours. Thus, the determination of a compression interval is based not only on increasing the corresponding compression ratio. Rather, other factors are taken into consideration, such as the desired response time.

When a compression interval is to be determined for a new event, there may be no frequency data information available for prior instances, either because there are no prior instances or an insufficient number of prior instances of the new event. Therefore, according to one embodiment, event compression is not applied to instances of new events until a sufficient number of instances of the new event is known, i.e., a frequency pattern has been established, so that an appropriate compression interval can be established. For example, suppose that event processor 104 begins receiving event data that corresponds to instances of a new event from device 102. In this situation, event processor 104 does not compress instances of the new event until a compression interval has been determined for the new event. According to one embodiment, the compression interval for the new event is determined after a specified number of instances have been processed so that the frequency of the instances can be determined. Thus, the first specified number of instances of the new event are processed by event processor 104 and reported to application 106. Once the compression interval has been established for the new event, then subsequent instances of the new event are processed as described herein.

FIG. 3 is a flow diagram 300 that describes an approach for processing event data when a compression interval has not yet been determined, in accordance with an embodiment. In step 302, event data is received that specifies one or more instances of a new event, for which a compression interval has not yet been determined.

In step 304, the event data is reported without compression. For example, event processor 104 reports the event data received from device 102 to application 106 without compressing any of the instances of the new event.

In step 306, a compression interval is determined for the new event based upon frequencies of instances of the new event. Steps 304 and 306 may be performed in any order, for example, the compression interval for the new event may be determined before the initial set of instances are reported without compression. Steps 302 and 304 may be repeated as many time as necessary to obtain a sufficient number of instances to determine a compression interval for the new event.

Once a sufficient number of instances of the new event have been processed to determine the compression interval for the new event, then in step 308, the compression interval is used to compress additional instances of the new event. For example, event processor 104 begins compressing additional instances of the event received from device 102 and reports to application 106. Thus, event processor 104 reports to application 106 a specified number of instances of the new event without compression until the compression interval is determined for the new event.

The event data may be received as a single data item that specifies all of the instances or a steam of data items, where each data item in the stream specifies a subset of the instances of the new event. In either situation, event compression is not performed until an event interval has been determined.

III. Compression Interval Tables

According to another embodiment, compression interval tables are used to assign compression intervals to events. FIG. 4 is a block diagram that depicts a compression interval table 400 determined in accordance with an embodiment. Compression interval table 400 includes rows 402, 404, 406, 408 that each corresponds to a particular compression interval, namely, INTERVAL1, INTERVAL2, INTERVAL3 and INTERVAL4, respectively. Compression interval table 400 is depicted in the figures and described as having four entries corresponding to four compression intervals for purposes of explanation, however, any number of entries may be used.

Compression interval table 400 also includes columns 410, 412. Column 410 contains identification data that names a particular compression interval associated with each row 402, 404, 406, 408. Column 412 contains data that specifies the duration of the compression interval to use for compression intervals INTERVAL1, INTERVAL2, INTERVAL3 and INTERVAL4. In the present example, column 412 specifies that the duration of compression interval INTERVAL1 is 10 seconds, the duration of compression interval INTERVAL2 is 600 seconds (ten minutes), the duration of compression interval INTERVAL3 is 3600 seconds (one hour) and the duration of compression interval INTERVAL4 is 86400 seconds (24 hours).

The compression interval values in compression interval table 400 are provided as example values and the particular compression interval values used for a particular application may vary depending upon the requirements of the particular application.

According to one embodiment, events are assigned a compression interval from compression interval table 400 based upon the frequency pattern of instances of the events and other factors, such as desired response time, that may be applicable to a particular situation. For example, suppose that instances of a first event are occurring at a frequency of ten times per second. In this situation, it may be appropriate to assign the first event to INTERVAL1, with a compression interval of ten seconds. If the frequency of ten times per second is maintained, then each one hundred instances will be compressed into a single reporting event, providing a compression ratio of one hundred-to-one and a response time of ten seconds. Different events having instances occurring at different frequencies may be simultaneously compressed using different compression intervals.

As another example, suppose that frequencies of instances of a second event are occurring at a frequency of once every six thousand seconds (100 minutes). The second event might be assigned to either INTERVAL3 or INTERVAL4, recognizing that if assigned to INTERVAL3, there would be no event compression, assuming the frequency pattern stayed the same. In this situation, the reporting interval of once every 3600 seconds or every 86400 seconds might be inappropriate for certain application, for example a customer service application where events need to be reported more frequently. Thus, the second event might be assigned to INTERVAL2, to provide a reporting frequency of 600 seconds (10 minutes), even though this would result in no compression.

According to one embodiment, a set of mechanisms or processes are established and assigned to process instances of events against a set of compression intervals defined by a compression table. For purposes of explanation, these mechanisms or processes are referred to herein as "patrol threads," although the invention is not limited to software processes or multi-threaded processing environments. According to this embodiment, each patrol thread is assigned to a particular compression interval defined by a compression interval table. Thus, four patrol threads are assigned to compression interval table 400, with each patrol thread being assigned to process instances of events based upon a particular compression interval. The first patrol thread is assigned to process all instances of events assigned to compression interval INTERVAL1. The first patrol thread is therefore responsible for processing event data, generating report data based upon the event data and then deleting the event data for the set of events assigned to compression interval INTERVAL1. Three other patrol threads are assigned to the other compression intervals in compression interval table 400, respectively, and process their respective instances of events in a similar manner.

According to another embodiment, a set of aging timers is assigned to a set of compression intervals to initiate event compression. In the present example, an aging timer would be used with each compression interval INTERVAL1, INTERVAL2, INTERVAL3 and INTERVAL4. At the expiration of one of the timers, event compression is performed on all events assigned to the corresponding compression interval. For example, a first aging timer associated with compression interval INTERVAL1 is set to expire after ten seconds. At the expiration of the first aging timer, event compression is performed on all events assigned to compression interval INTERVAL1. Thus, report data is generated for the instances of each event received since the first aging timer was started and then the instances are deleted or "flushed" accordingly. The first aging timer is then restarted and the process repeated. Aging timers may be used in conjunction with the patrol threads discussed herein. The use of multiple aging timers aids in smoothing out reporting frequencies using multiple overlapping and non-overlapping timers or threads.

TABLE I

| PATROL THREAD #1 | $CR_1 = P1/0 \rightarrow$ Infinite |
|---|---|
| PATROL THREAD #2 | $CR_2 = P2/P1$ |
| PATROL THREAD #3 | $CR_3 = P3/P2$ |
| PATROL THREAD #4 | $CR_4 = P4/P3$ |
| FOR EVENTS THAT OCCUR LESS FREQUENTLY THAN P4, $CR_5 = 1$ | |

Table I depicts a formula for determining an average compression ratio ($CR_1$, $CR_2$, $CR_3$, $CR_4$) for each of four patrol threads, based upon worst case response timers P1, P2, P3 and P4. Note that the average compression ratio for PATROL THREAD #1 is infinite, while the compression ratio ($CR_5$) for events that occur less frequently than P4 will be 1, since the timer expires before they are compressed. The Min/max compression ratio (CR) is the average of $CR_1$, $CR_2$, $CR_3$, $CR_4$ and $CR_5$.

IV. Adaptive Compression Interval Determination

In some situations, the frequency of event instances may change over time. For example, in the context of a communications network, the number of instances of network errors may vary with the amount of network traffic. According to one embodiment, compression intervals are updated to reflect changes in frequency patterns of event instances. This may involve periodically determining a new compression interval for an event and comparing the new compression interval to the current compression interval for the event to determine whether the compression interval should be updated. In some situations, an event may cease to occur, for example, in the event of a network or computer system failure. In this situation, a default compression interval may be used until a sufficient amount of new event data has been received to reestablish the compression interval as described herein.

Alternatively, if the compression interval table approach is used as described herein, then a new compression interval may be periodically assigned to an event based upon the frequency of a recent set of instances of the event to ensure that the desired compression interval is assigned to the event. Furthermore, the compression interval values in a compression interval table may be updated to reflect changes in frequencies of event instances. This may also include adding or removing compression interval levels to change the available granularity. For example, in response to a change in frequencies of event instances, it may be determined that it would be desirable to provide a compression interval with a duration value between the values for compression intervals INTERVAL1 and INTERVAL2. In this situation, a new compression interval, e.g., INTERVAL1.5 may be added to compression interval table 400 having a duration of 300 seconds.

Figure 5:
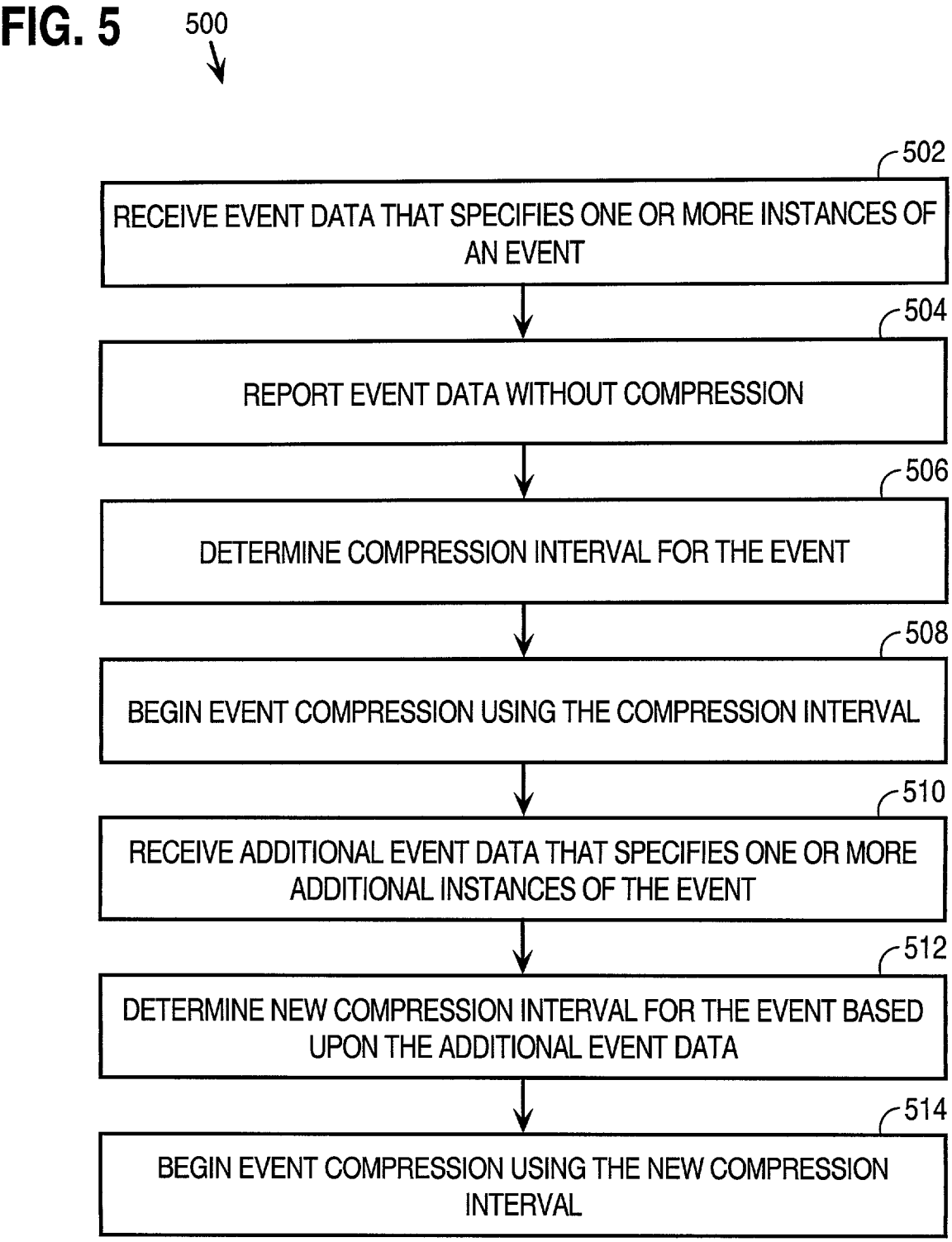
FIG. 5 is a flow diagram that depicts an adaptive approach for updating compression intervals.

FIG. 5 is a flow diagram 500 that depicts an adaptive approach for updating compression intervals according to an embodiment. In step 502, event data is received that specifies one or more instances of an event, for which a compression interval has not yet been determined.

In step 504, the event data is reported without compression. For example, event processor 104 reports the event data received from device 102 to application 106 without compressing any of the instances of the event.

In step 506, a compression interval is determined for the event based upon frequencies of instances of the event. If a sufficient amount of data is not available to determine a compression interval, then steps 502 and 504 may be repeated until a sufficient amount of data is available. In step 508, the compression interval is used to compress additional instances of the event that are received.

In step 510, additional event data is received that specifies one or more additional instances of the event. In step 512, a new compression interval is determined for the event based upon the additional event data. The new compression interval may also be determined based upon a combination of the prior event data and the additional event data. The new compression interval may be calculated according to a particular algorithm or a compression interval may be selected from a compression interval table, depending upon the requirements of a particular application. Determining the new compression interval may be triggered based upon a particular event, such as a change in the frequency of instances for the event, or may be performed periodically.

In step 514, the new compression interval is used to compress additional instances of the event that are received.

The adaptive approach for updating compression intervals is particularly advantageous when the frequency of instances of events changes over time, regardless of the particular reason for the change, because it provides for a more optimal compression interval.

V. Implementation Mechanisms

Various embodiments have been described herein in the context of device 102 generating event data and providing event data to event processor 104. Event data may be received from a variety of sources, e.g., from a system error log, an XML log or SNMP traps, and the invention is not limited to any particular source or context for event data.

The approaches described herein for determining a compression interval to be used for an event may be implemented in a Graphical User Interface (GUI) environment that allows administrative personnel to manually specify certain criteria. For example, a graphical representation of a compression interval table may be presented to an administrative user on a GUI. The user may then be allowed to set or change compression interval values using the GUI. According to an embodiment, a user may initially assign particular compression intervals to events. Thereafter, the compression intervals may be automatically updated according to the adaptive approach described herein. Whenever compression intervals are updated according to the adaptive approach, administrative personnel may be notified of this change via the GUI. Alternatively, compression tables may be automatically updated using an automated process or mechanism.

Event processor 104 has been described herein as both determining or assigning a compression interval to an event and performing event compression, however the invention is not limited to these embodiments. These functions may be performed separately by other entities depending upon the requirements of a particular application. For example, determining or assigning a compression interval to an event may be performed by a stand-alone mechanism or process, or by application 106, while event processor 104 performs event compression.

Figure 6A:
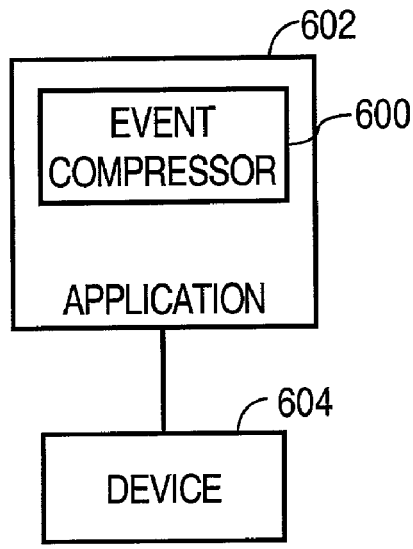
FIG. 6A is a block diagram that depicts an event processing arrangement.

FIGS. 6A-6D are block diagrams that depict example implementations according to other embodiments. The invention is not limited to these example implementations and that implementations may vary depending upon the requirements of a particular application. In FIG. 6A, an event compressor 600 is configured to determine compression intervals and perform event compression as described herein. In the arrangement depicted in FIG. 6A, event compressor 600 is implemented as part of an application 602 that is communicatively coupled to a device 604. In this arrangement, application 602 receives event data generated by device 604. Event compressor 600 processes the event data and generates and provides reporting data to application 602 for processing.

Figure 6B:
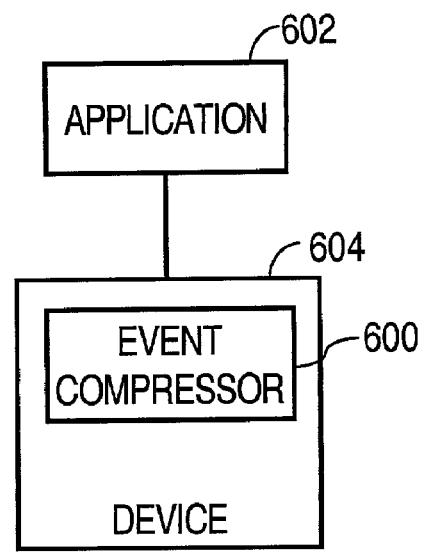
FIG. 6B is a block diagram that depicts another event processing arrangement.
Figure 6C:
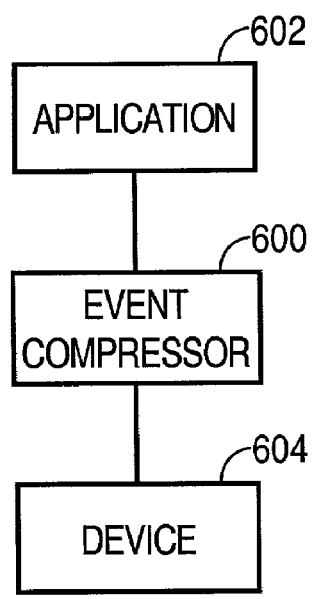
FIG. 6C is a block diagram that depicts yet another event processing arrangement.
Figure 6D:
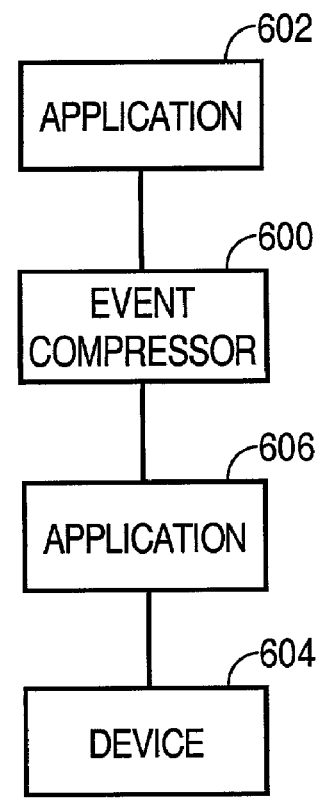
FIG. 6D is a block diagram that depicts a further event processing arrangement.

In FIG. 6B, event compressor 600 is implemented in device 604. In FIG. 6C, event compressor 600 is implemented as a separate entity that is communicatively coupled to both application 602 and device 604. In FIG. 6D, event compressor 600 is implemented as a separate entity that is communicatively coupled to both application 602 and another application 606. Thus, event compressor 600 does not have to be directly coupled to or associated with the entity that generates event data. Rather, the event compressor 600 may receive event data indirectly through other entities. Hence, a variety of implementations are possible and the invention is not limited to any particular implementation or context.

The approach described herein for performing event compression may be implemented in a variety of contexts and the invention is not limited to any particular context. For example, the approach may be implemented in communications networks to compress network and device events, such as error conditions. As another example, the approach may be implemented in customer service management and customer billing applications.

The approach described herein reduces the overhead conventionally required to process events by reducing the number of instances of events that are reported to an application. Thus, instead of an application receiving one hundred report messages for one hundred events that occurred during a compression interval, the application receives a single report message indicating that the event occurred during the compression interval, and optionally, the number of instances of the event that occurred during the compression interval. This can greatly reduce the burdens on administrative personnel caused by large numbers of report messages reporting multiple instances of the same event. Also, the approach provides for determining a compression interval that is more optimal for a particular situation by providing a better balance between insufficient compression (under compression) and poor performance associated with over compression.

Figure 7:
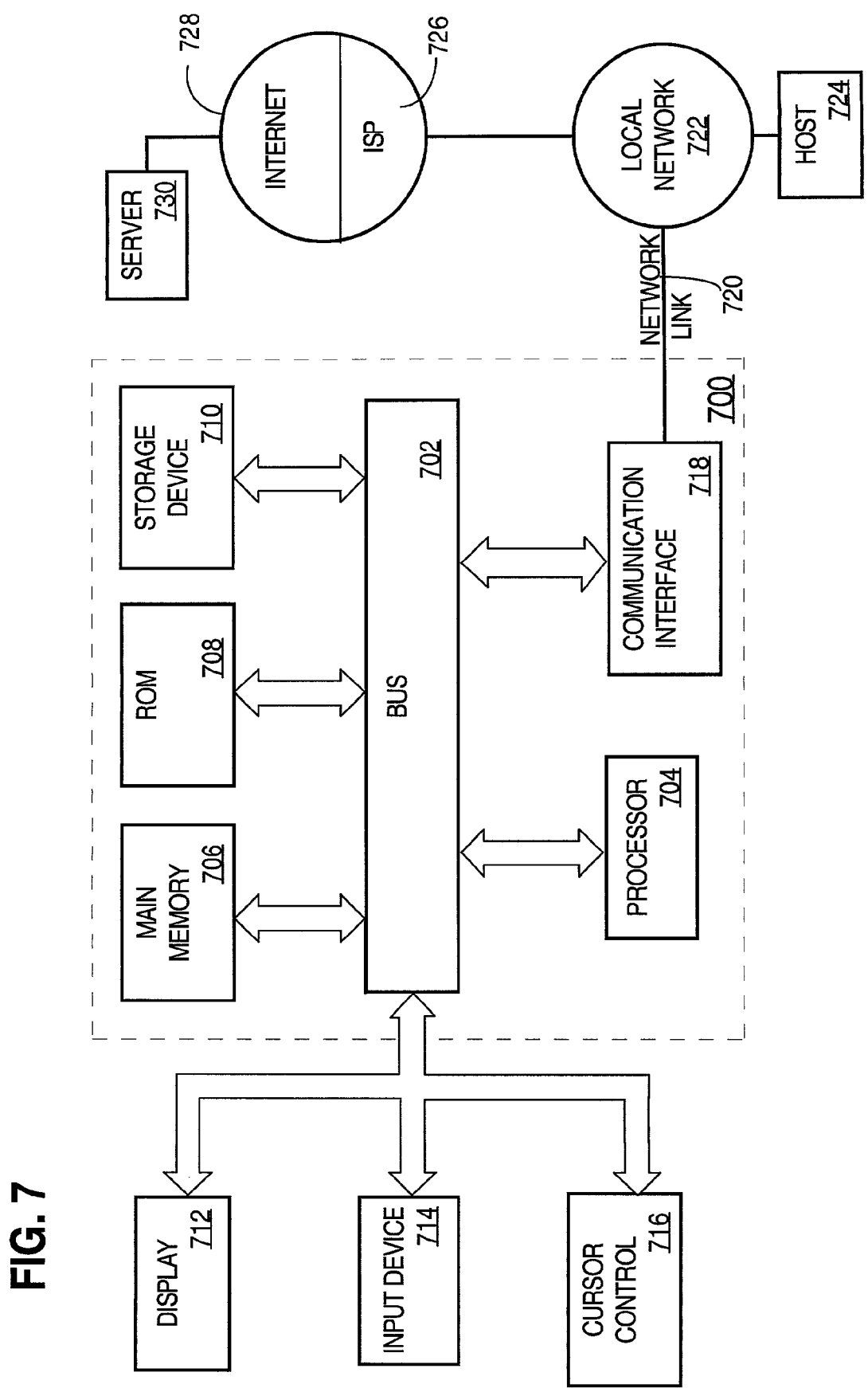
FIG. 7 is a block diagram that depicts a computer system on which embodiments may be implemented.

FIG. 7 is a block diagram that illustrates a computer system 700 upon which an embodiment may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for determining compression intervals and performing event compression. According to one embodiment, determining compression intervals and performing event compression is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for determining compression intervals and performing event compression as described herein.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing event data comprising the computer-implemented steps of:
    receiving first event data that specifies times during a first interval of time of a first length at which a first set of one or more instances of an event occurred;
    determining, based upon the first event data, first occurrence frequencies of the event;
    receiving second event data that specifies times during a second interval of time of the first length at which a second set of one or more instances of the event occurred;
    determining, based upon the second event data, second occurrence frequencies of the event, the second occurrence frequencies being different from the first occurrence frequencies;
    determining, based upon the first occurrence frequencies and the second occurrence frequencies, a length of a third time interval that is to be used to select other instances of the event for event compression;
    wherein determining the length of the third time interval comprises,
        determining if the first occurrence frequencies are greater than the second occurrence frequencies then determining the length of the third interval to be greater than the first length, and
        determining if the first occurrence frequencies are less than the second occurrence frequencies then determining the length of the third interval to be less than the first length;
    receiving third event data that specifies times during the third interval of time at which a third set of one or more instances of the event occurred; and
    selecting for event compression, from the third set of one or more instances of the event, one or more particular instances of the event that occurred during the third time interval; and
    performing event compression on the selected one or more particular instances of the event that occurred during the third time interval.

2. The method as recited in claim 1, wherein determining, based the length of the third time interval includes determining the length of the third time interval based upon an average occurrence frequency for the first set of one or more instances of the event and an average occurrence frequency for the second set of one or more instances of the event.

3. The method as recited in claim 1, wherein determining, based the length of the third time interval includes determining the length of the third time interval by selecting, based upon the first occurrence frequencies and the second occurrence frequencies, the length of the third time interval from a specified set of available time interval lengths.

4. The method as recited in claim 1, further comprising the computer-implemented step of generating report data that specifies that the one or more particular instances of the event occurred during the third time interval.

5. The method as recited in claim 4, wherein the report data specifies how many particular instances of the event occurred during the third time interval.

6. The method as recited in claim 1, further comprising the computer-implemented step of updating the length of the third time interval based upon frequencies of any of the third set of one or more instances of the event.

7. A computer-readable volatile or non-volatile storage medium for processing event data, the computer-readable medium storing one or more sequences of instructions which, when executed by one or more processors, cause the one or more processors to perform the steps of:
    receiving first event data that specifies times during a first interval of time of a first length at which a first set of one or more instances of an event occurred;
    determining, based upon the first event data, first occurrence frequencies of the event;
    receiving second event data that specifies times during a second interval of time of the first length at which a second set of one or more instances of the event occurred;
    determining, based upon the second event data, second occurrence frequencies of the event, the second occurrence frequencies being different from the first occurrence frequencies;
    determining, based upon the first occurrence frequencies and the second occurrence frequencies, a length of a third time interval that is to be used to select other instances of the event for event compression;

wherein determining the length of the third time interval comprises,
    determining if the first occurrence frequencies are greater than the second occurrence frequencies then determining the length of the third interval to be greater than the first length, and
    determining if the first occurrence frequencies are less than the second occurrence frequencies then determining the length of the third interval to be less than the first length;
receiving third event data that specifies times during the third interval of time at which a third set of one or more instances of the event occurred; and
selecting for event compression, from the third set of one or more instances of the event, one or more particular instances of the event that occurred during the third time interval; and
performing event compression on the selected one or more particular instances of the event that occurred during the third time interval.

8. The computer-readable volatile or non-volatile storage medium as recited in claim 7, wherein determining the length of the third time interval includes determining the length of the third time interval based upon an average occurrence frequency for the first set of one or more instances of the event and an average occurrence frequency for the second set of one or more instances of the event.

9. The computer-readable volatile or non-volatile storage medium as recited in claim 7, wherein determining the length of the third time interval includes determining the length of the third time interval by selecting, based upon the first occurrence frequencies and the second occurrence frequencies, the length of the third time interval from a specified set of available time interval lengths.

10. The computer-readable volatile or non-volatile storage medium as recited in claim 7, further comprising one or more additional sequences of instructions which, when executed by the one or more processors, cause the one or more processors to perform the additional step of generating report data that specifies that the one or more particular instances of the event occurred during the third time interval.

11. The computer-readable volatile or non-volatile storage medium as recited in claim 10, wherein the report data specifies how many particular instances of the event occurred during the third time interval.

12. The computer-readable volatile or non-volatile storage medium as recited in claim 7, further comprising the computer-implemented step of updating the length of the third time interval based upon frequencies of any of the third set of one or more instances of the event.

13. An apparatus for processing event data, the apparatus comprising an event data processing mechanism configured to:
    receiving first event data that specifies times during a first interval of time of a first length at which a first set of one or more instances of an event occurred;
    determining, based upon the first event data, first occurrence frequencies of the event;
    receiving second event data that specifies times during a second interval of time of the first length at which a second set of one or more instances of the event occurred;
    determining, based upon the second event data, second occurrence frequencies of the event, the second occurrence frequencies being different from the first occurrence frequencies;
    determining, based upon the first occurrence frequencies and the second occurrence frequencies, a length of a third time interval that is to be used to select other instances of the event for event compression;
    wherein determining the length of the third time interval comprises,
        determining if the first occurrence frequencies are greater than the second occurrence frequencies then determining the length of the third interval to be greater than the first length, and
        determining if the first occurrence frequencies are less than the second occurrence frequencies then determining the length of the third interval to be less than the first length;
    receiving third event data that specifies times during the third interval of time at which a third set of one or more instances of the event occurred; and
    selecting for event compression, from the third set of one or more instances of the event, one or more particular instances of the event that occurred during the third time interval; and
    performing event compression on the selected one or more particular instances of the event that occurred during the third time interval.

14. The apparatus as recited in claim 13, wherein determining, the length of the third time interval includes determining the length of the third time interval based upon an average occurrence frequency for the first set of one or more instances of the event and an average occurrence frequency for the second set of one or more instances of the event.

15. The apparatus as recited in claim 13, wherein determining the length of the third time interval includes determining the length of the third time interval by selecting, based upon the first occurrence frequencies and the second occurrence frequencies, the length of the third time interval from a specified set of available time interval lengths.

16. The apparatus as recited in claim 13, further comprising one or more additional sequences of instructions which, when executed by the one or more processors, cause the one or more processors to perform the additional step of generating report data that specifies that the one or more particular instances of the event occurred during the third time interval.

17. The apparatus as recited in claim 16, wherein the report data specifies how many particular instances of the event occurred during the third time interval.

18. The apparatus as recited in claim 13, wherein the event data processing mechanism is further configured to update the length of the third time interval based upon frequencies of any of the third set of one or more instances of the event.

19. A method for determining a time interval to be used for event compression of an event, the method comprising the computer-implemented steps of:
    automatically determining the time interval to be used for event compression of the event based upon first frequency data that specifies first occurrence frequencies of one or more instances of the event; and
    automatically adjusting the time interval to be used for event compression based upon second frequency data that specifies second occurrence frequencies of one or more instances of the event;
    wherein automatically adjusting the time interval to be used for event compression comprises,
        determining if the first occurrence frequencies are greater than the second occurrence frequencies then increasing the length of the time interval, and determining if the first occurrence frequencies are less than the second occurrence frequencies then decreasing the length of the time interval.

20. A network management apparatus configured to:

receive event data that specifies one or more instances of an event that have occurred;

determine, based at least upon the event data, first frequencies of occurrence of the one or more instances of the event;

determine a length of a compression time interval based upon the determined first frequencies of occurrence of the one or more instances of the event;

perform event compression on one or more other instances of the event that are within the compression time interval;

receive second event data that specifies one or more additional instances of an event that have occurred;

determine, based at least upon the second event data, second frequencies of occurrence of the one or more additional instances of the event;

increase the length of the compression time interval upon determining the first frequencies of occurrence are greater than the second frequencies of occurrence; and decrease the length of the compression time interval upon determining that the first frequencies of occurrence are less than the second frequencies of occurrence.

21. A method for managing events in a communications network, the method comprising the computer-implemented steps of:

receiving event data that specifies one or more instances of an event that have occurred;

determining, based at least upon the event data, first frequencies of occurrence of the one or more instances of the event;

determining a length of a compression time interval based upon the determined first frequencies of occurrence of the one or more instances of the event;

performing event compression on one or more other instances of the event that are within the compression time interval;

receiving second event data that specifies one or more additional instances of an event that have occurred;

determining, based at least upon the second event data, second frequencies of occurrence of the one or more additional instances of the event;

updating the length of the compression time interval based upon the determined first frequencies of occurrence and the determined second frequencies of occurrence;

wherein updating the length of the compression time interval comprises, determining if the first frequencies of occurrence are greater than the second frequencies of occurrence then increasing the length of the compression time interval, and determining if the first frequencies of occurrence are less than the second frequencies of occurrence then decreasing the length of the compression time interval.

22. A computer-readable volatile or non-volatile storage medium for managing events in a communications network, the computer-readable medium storing one or more sequences of instructions which, when executed by one or more processors, cause the one or more processors to perform the steps of:

receiving event data that specifies one or more instances of an event that have occurred;

determining, based at least upon the event data, first frequencies of occurrence of the one or more instances of the event;

determining a length of a compression time interval based upon the determined first frequencies of occurrence of the one or more instances of the event;

performing event compression on one or more other instances of the event that are within the compression time interval;

receiving second event data that specifies one or more additional instances of an event that have occurred;

determining, based at least upon the second event data, second frequencies of occurrence of the one or more additional instances of the event;

updating the length of the compression time interval based upon the determined first frequencies of occurrence and the determined second frequencies of occurrence;

wherein updating the length of the compression time interval comprises, determining if the first frequencies of occurrence are greater than the second frequencies of occurrence then increasing the length of the compression time interval, and determining if the first frequencies of occurrence are less than the second frequencies of occurrence then decreasing the length of the compression time interval.

* * * * *

UNITED STATES PATENT AND TRADEMARK OFFICE
CERTIFICATE OF CORRECTION

PATENT NO. : 7,606,891 B1  
APPLICATION NO. : 10/179542  
DATED : October 20, 2009  
INVENTOR(S) : Shyu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Twelfth Day of October, 2010

David J. Kappos  
*Director of the United States Patent and Trademark Office*